F. SOUCZEK.
DEVICE FOR IMPARTING RECIPROCATING MOVEMENTS, ESPECIALLY FOR SHUTTLE DRIVING.
APPLICATION FILED JUNE 30, 1920.
1,358,474.
Patented Nov. 9, 1920.
2 SHEETS—SHEET 1.
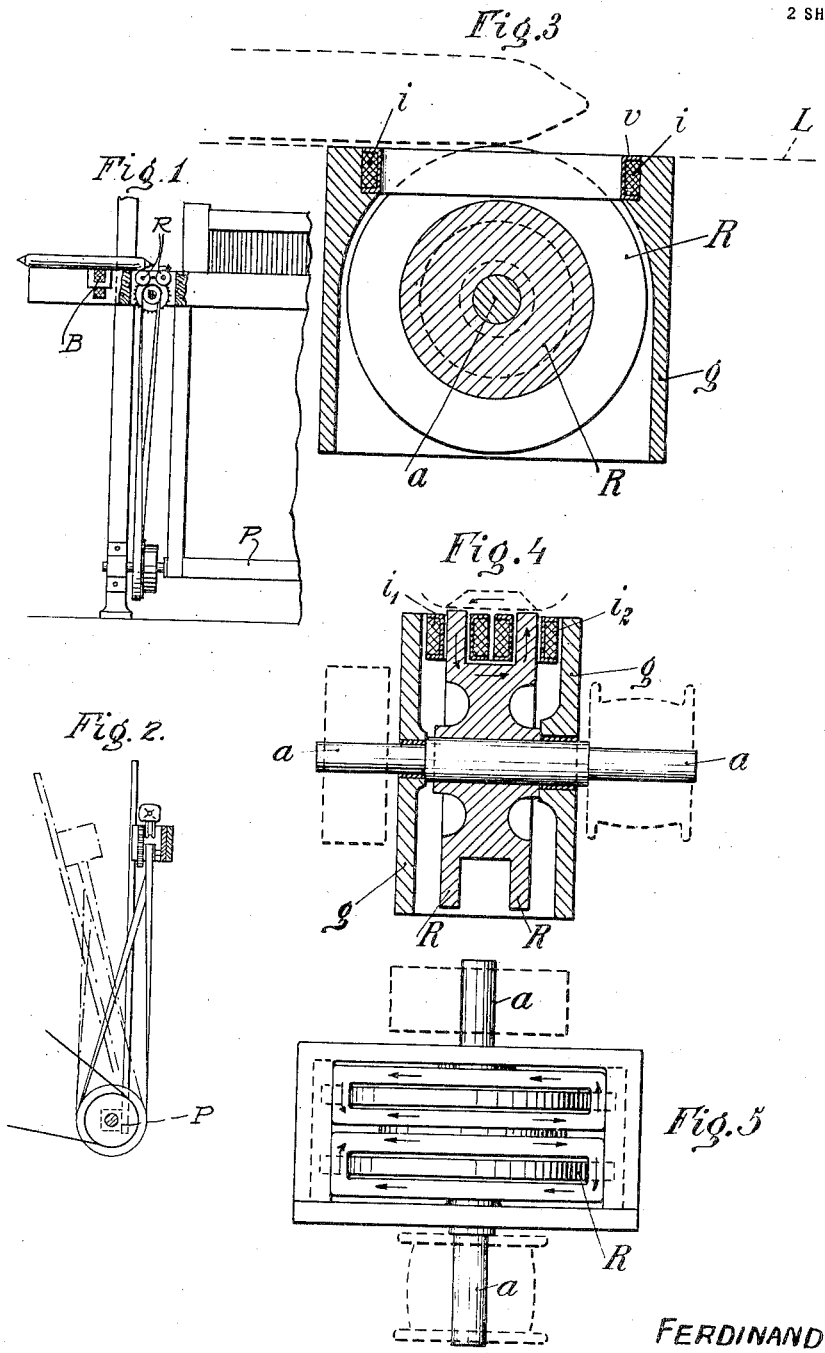
FERDINAND SOUCZEK
Inventor
By his Attorney
H. W. Pensler

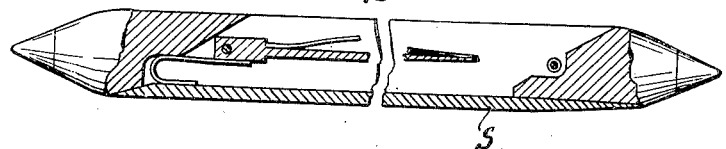
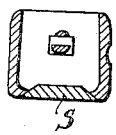
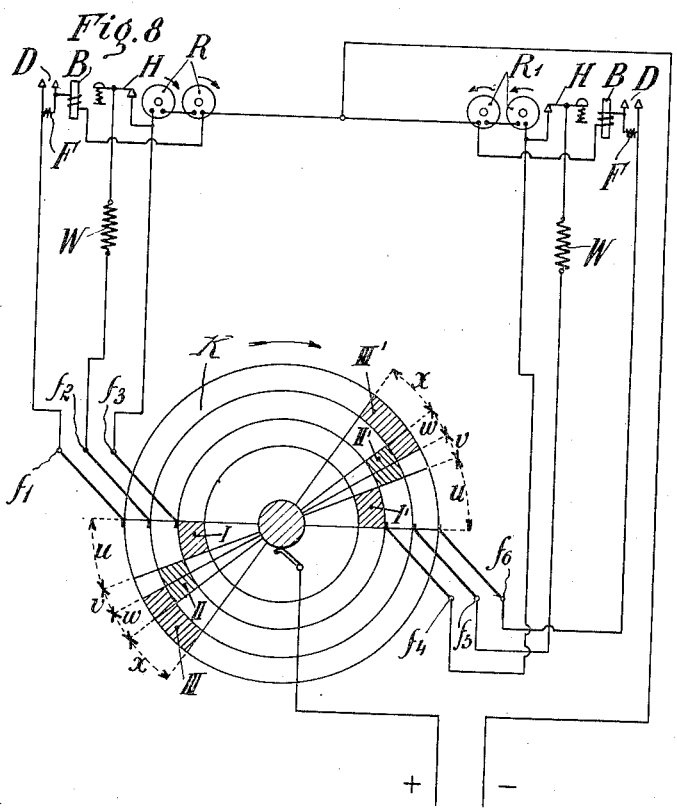

UNITED STATES PATENT OFFICE.

FERDINAND SOUCZEK, OF NACHOD, CZECHO-SLOVAKIA.

DEVICE FOR IMPARTING RECIPROCATING MOVEMENTS, ESPECIALLY FOR SHUTTLE-DRIVING.

1,358,474.  Specification of Letters Patent.  Patented Nov. 9, 1920.

Application filed June 30, 1920. Serial No. 393,213.

*To all whom it may concern:*

Be it known that I, FERDINAND SOUCZEK, a citizen of the Czecho-Slovakian Republic, residing at Nachod, Czecho-Slovakia, have invented new and useful Devices for Imparting Reciprocating Movements, Especially for Shuttle-Driving.

This invention relates to a device for imparting reciprocating movement to freely moving bodies, and is particularly adapted for use as shuttle driving mechanisms for looms. The known electromagnetic shuttle-driving mechanism consists of stationary electromagnets which are placed at the ends of the shuttle race and convert the energy of the electric current into mechanical energy for driving the shuttle. Such looms thus require two sources of energy for their operation, namely, the purely mechanical energy for driving the loom-shaft, and the electrical energy required to drive the shuttle.

The device according to the present invention is characterized in that the reciprocating movement of the body is caused by frictional contact of the body along the circumferential edge of quickly rotating disk-shaped electromagnets which are periodically excited. The impulse imparted to the body is obtained solely from the circumferential velocity of the rotating electromagnets, while the electric current merely causes the body to adhere to or engage the rotating disk through electromagnetic attraction. The velocity of the movement imparted to the body thus depends solely upon the circumferential velocity of the electromagnetic disks and not upon the intensity of the current, provided that the current is strong enough to cause the necessary surface contact of the body with the circumferential edge of the disks.

When the device is applied to shuttle-driving mechanism the disks are driven from the main loom-shaft or from the cam-shaft by means of suitable belts, toothed gears, flexible shafts or the like, with the necessary velocity and in the required direction. The electromagnets may be excited either by continuous or by alternating current under the control of a contact-cylinder coupled to the cam shaft.

The accompanying drawings show the device applied to shuttle-driving mechanism for looms.

Figure 1 is a front elevation of a part of a loom fitted with the device;

Fig. 2 is a cross-section of the breast beam;

Fig. 3 is a section in the direction of the shuttle-movement, showing one form of the electromagnetic disks;

Fig. 4 is a section of the same at right angles to Fig. 3;

Fig. 5 is a plan view of the same;

Fig. 6 is a sectional view of a shuttle provided with an iron armature;

Fig. 7 is a cross-section of the same;

Fig. 8 is a wiring diagram showing one form of electrical connections.

The device illustrated in the drawings consists of a number of electromagnetic disks placed at each end of the shuttle-race, an iron-clad shuttle, a device for controlling the supply of current to the said electromagnets, and a number of shuttle-stopping magnets.

The magnetic rollers R (Figs. 3, 4 and 5) are made of iron and are fastened to iron shafts $a$ placed so that the upper edges of the rollers project into the shuttle-race. These rollers rotate in casings $g$, provided at each end of the shuttle-race. In the arrangement shown there are two such rollers at each end of the shuttle-race, one in advance of the other in the direction of the shuttle-movement, but it should be understood that the number and grouping of the said rollers is not limited to this particular arrangement.

The rollers R are continuously driven from the cam-shaft P of the loom by belts as shown (or by chains, non-magnetic toothed gears or the like), with a circumferential velocity appropriate to the desired speed of the picking movement of the shuttle, the rollers R at opposite ends of the shuttle-race rotating in opposite directions. Each group of two rollers R is driven by one common gear-wheel connected by a cross-belt with the cam-shaft.

Each roller R has a circumferential groove for the magnetizing coils $i^1$ $i^2$ (Fig. 4) which are placed horizontally at the upper extremity of the casing $g$ and fastened to the same so that each coil encircles the upper portion of one of the rims, so that when the coils are excited they magnetize only the upper portion of the rotating disk. The magnetic flow is closed by the iron armature $s$ of the shuttle resting on the roller, as indicated by arrows in Fig. 4.

Each roller may, of course, have a plurality of grooves and rims or may be composed of a plurality of grooved iron disks or plates in order to permit of the use of alternating current.

The rollers R are placed one in advance of the other in the direction of the picking movement, and may be rotated at different speeds so that the shuttle receives the first impulse from the extreme roller and has its movement accelerated as it passes over the farther roller rotating at a higher speed. In this case each of the rollers may be driven separately from the cam-shaft by means of suitable belts, gears or the like. The magnetizing coils may also be placed so that they fill up the whole annular groove in the roller, in which case the whole roller is magnetized when the coil is excited, and such coils may either rotate with the roller or be kept stationary by suitable securing means.

The operation of the device is as follows:

In the starting position the shuttle is the position indicated in Fig. 1. As soon as the electromagnetic roller disks in its proximity are excited, the iron-clad shuttle is drawn into contact with the peripheries of the disks and is hurled by the circumferential velocity of the rotating electromagnetic disks through the shuttle-race to the group of electromagnetic rollers $R_1$ placed at the opposite end of the shuttle-race, which rollers $R_1$ are rotated in a direction opposite to the direction of rotation of the rollers R. The electromagnets of the rollers $R_1$ are excited at the moment of the approach of the shuttle, and according to the degree of magnetization (i. e. according to the intensity of the current induced to circulate in the coils) the rollers $R_1$ may either bring the shuttle immediately to rest and hurl it back to the rollers R, or may merely exert a braking influence so as to reduce the velocity of the shuttle which may be brought to rest by the magnet B.

The contact-disk K is driven at a number of revolutions equal to one-half of the number of revolutions of the loom-shaft P and is so adjusted that the contact-finger $f_3$ closes the circuit over the section I to the magnetic rollers R at the moment at which the shuttle is to be hurled from its left-hand end position. When the disk K has moved through the necessary angle the contact finger $f_5$ closes the circuit to the right-hand magnetic rollers $R_1$ in series with the resistance W and slides along the section II¹. The angle $u$ plus $v$ corresponds to the period of the movement of the shuttle once through the shuttle-race. While the shuttle is completing its movement along the shuttle-race, the contact-finger $f_6$ comes into contact with the section III¹, sliding through the angle $w$, and thus closes the circuit of the braking magnet B, thereby bringing the shuttle to rest as soon as the iron armature of the shuttle is brought to rest on the two contacts D. When the disk has moved through the angle $x$, the circuit is interrupted, and the shuttle rests during the beating-up of the weft, till the finger $f_4$ closes the circuit of the right-hand magnetic rollers $R_1$, whereupon the operation is repeated, the shuttle in this case being hurled from right to left.

An auxiliary contact H is provided in order to prevent the shuttle being picked prematurely at the starting of the loom-operation due to the braking current being still closed over the section II. In such case the shuttle interrupts the magnetizing circuit at the balancing contact H. To avoid sparking at the contact H at the moment of the arrival of the shuttle, the angle $w$ of section II, II¹ is kept so small that the fingers $f_5$ and $f_2$ have left section II, II¹ before the shuttle arrives at the contact H. F is a resistance inserted between the contacts D. The contact-disk K rotates in a casing filled with oil, petroleum or the like, to prevent sparking.

While the invention has been described as applied to the picking of loom shuttles, it is to be understood that the improvement is applicable to many other purposes, such as a pneumatic letter and package conveying means, or in general to all such purposes where free objects are hurled to and fro at high speed. My invention is therefore not to be limited to the particular embodiment illustrated and described, nor to be limited in its application to the fields specifically referred to in the foregoing description.

I claim as my invention:

1. A device for imparting reciprocating movement, comprising a rotary member, means for supporting the said member so as to rotate about a stationary axis, a freely moving body responsive to magnetic attraction and adapted to contact with the rotary member, and means for electro-magnetically exciting the rotary member and causing electro-magnetic attraction between the said body and member.

2. A device for imparting reciprocating movement, comprising a freely moving body responsive to magnetic attraction, a rotary member arranged with its periphery in the path of the body, means for supporting the said member so as to rotate about a stationary axis, means for guiding the body in contact with the periphery of the rotary member, and means for electromagnetically exciting the periphery of the rotary member, and thus causing electro-magnetic attraction between the said body and member.

3. A device for imparting reciprocating movement, comprising a rotary member, means for supporting the said member so as to rotate about a stationary axis, a freely moving body responsive to magnetic attraction, means for guiding the body in frictional contact with the periphery of the rotary member, and means for exciting the rotary member electromagnetically, and thus causing electromagnetic attraction between the said body and member.

4. A device for imparting reciprocating movement, comprising a rotary member, a second rotary member, means for supporting the said rotary members so as to rotate about stationary axes, means for rotating the members in opposite directions, a freely moving body responsive to magnetic attraction, means for guiding the body in frictional contact with the peripheries of the rotary members, means for exciting the members electromagnetically, and means on the body for causing electromagnetic attraction between the said body and the members.

5. A device for imparting reciprocating movement, comprising a rotary member having an annular groove therein, magnetizing coils located so as to inclose a segment of the member on each side of the groove, means for exciting the coils and the segments of the rotary member, a freely moving body responsive to magnetic attraction, means for guiding the body in frictional contact with the periphery of the rotary member, and an armature on the body for coöperation with the said coils.

6. A device for imparting reciprocating movement, comprising a rotary member having a recess therein, magnetizing coils, arranged in the recess tangentially to the rotary member, a freely moving body responsive to magnetic attraction, means for guiding the body in frictional contact with the periphery of the rotary member, means for exciting the coils and the part of the rotary member in contact with the body, and an armature on the body for coöperation with the coils.

7. A device for imparting reciprocating movement, comprising a freely moving body responsive to magnetic attraction, a plurality of rotary members arranged one in advance of the other in the direction of movement of the body, means for guiding the body in frictional contact with the peripheries of the rotary members, and automatic means for attracting the body to the members by electromagnetically exciting the parts of the rotary members in contact with the body.

8. A device for imparting reciprocating movement, comprising a freely moving body responsive to magnetic attraction, two groups of rotary members arranged one in advance of the other in the direction of movement of the body, means for supporting the rotary members so as to rotate about stationary axes, means for rotating the members of the one group in one direction and the members of the other group in the opposite direction, and electromagnetic means for automatically exciting the members of each group so as to cause electromagnetic attraction between the said body and the members, so that the body is hurled from one group to the other.

9. A device for imparting reciprocating movement, comprising a freely moving body responsive to magnetic attraction, a plurality of rotary members arranged one in advance of the other in the direction of movement of the body, means for supporting the rotary members so that they may rotate about stationary axes, means for driving the rotary members so that the more advanced member rotates at a higher circumferential speed, means for guiding the body in frictional contact with the peripheries of the members and from the low to the high speed member, means for exciting the members electromagnetically, and means on the body for causing electromagnetic attraction between the said body and member, so that the body may be hurled from the high speed member.

10. A device for imparting reciprocating movement, comprising a freely moving body responsive to magnetic attraction, a rotary member located so as to rotate with its periphery in the path of the moving body, means for supporting the said member so that it may rotate about a stationary axis, means for electromagnetically exciting the member, means on the body for causing electromagnetic attraction between the body and the member and so as to cause movement of the body in frictional contact with the periphery of the member, and fixed magnetic means for retaining the body in place.

In testimony whereof I affix my signature in presence of two witnesses.

FERDINAND SOUCZEK.

Witnesses:
JAN B. VOJÁČEK,
FRANK RAMSEY.